Dec. 1, 1936.                G. W. STAIR                2,062,947
                          BEARING ASSEMBLY
                        Filed Jan. 24, 1936
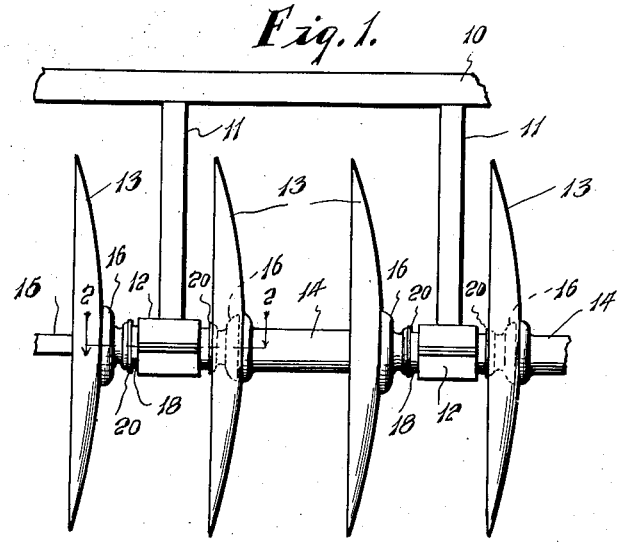
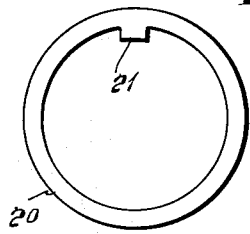
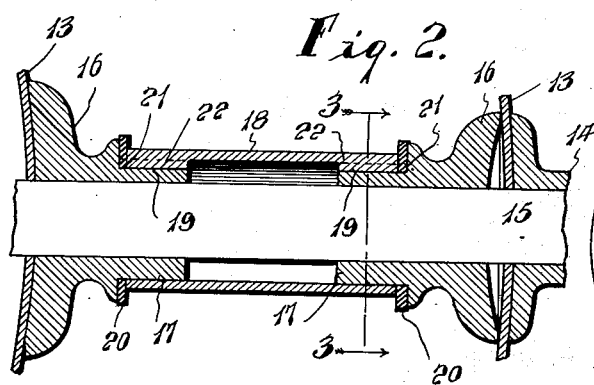
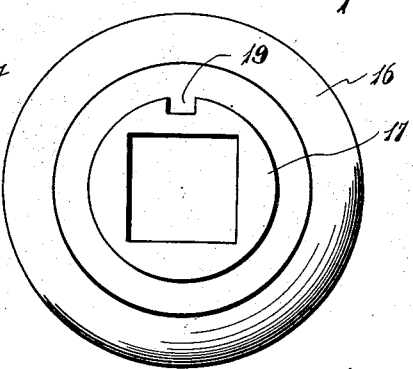
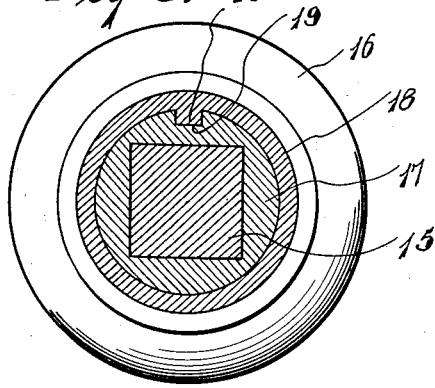
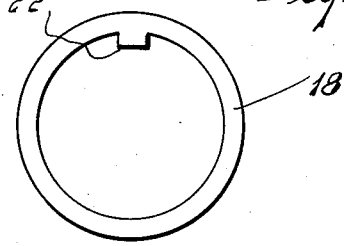
Inventor
George W. Stair
By L. F. Randolph Jr.
Attorney Patented Dec. 1, 1936

2,062,947

UNITED STATES PATENT OFFICE 2,062,947

BEARING ASSEMBLY

George W. Stair, Merino, Colo.

Application January 24, 1936, Serial No. 60,734

2 Claims. (Cl. 308—19)

This invention relates to a bearing construction or assembly especially adapted for use in connection with rotary disc cultivators, although not limited to that use.

In disc cultivators and other agricultural machinery and the equivalent, there is considerable wear on the bearings or rotatable parts which necessitates replacement from time to time. In existing constructions, the discs and bearing parts are unitary and have to be discarded as a unit and at considerable expense.

The object of my invention is to provide a novel and relatively inexpensive means utilizing sleeves or tubes as the bearing, and in a manner which enables their rapid or expeditious removal and replacement. Such sleeves or bearings are relatively inexpensive and enable the full life of the disc cultivators to be obtained before discarding them.

The more specific objects and advantages will become apparent from a consideration of the description following taken in connection with accompanying drawing illustrating an operative embodiment.

In the drawing:—

Figure 1 is a view in elevation showing the mounting of a rotary disc cultivator by my improved bearing assembly;

Figure 2 is a longitudinal sectional view on an enlarged scale taken on the line 2—2 of Figure 1;

Figure 3 is a transverse section taken on the plane of line 3—3 of Figure 2;

Figure 4 is an inner end view of one of these hub members;

Figure 5 is an elevation of one of the washers, and

Figure 6 is an end view of the bearing sleeve.

Referring specifically to the drawing wherein like reference characters designate like or similar parts, 10 fragmentarily shows the frame of a disc harrow, for example, having depending arms 11 terminating in conventional bearing housings 12 at their lower end.

Cultivator discs are shown at 13 and usually are in units of any desired plurality, the discs of each unit being rigidly connected together by means of hubs 14 and all of the units being removably mounted on a rotatable square shaft 15 as shown.

Instead of all of the units of the discs and elements 14 being inseparable, they are separable at the housings 12. More specifically, those discs 13 between which the housings 12 are located, have hub members 16 rigidly connected thereto or removably abutting the same as preferred. Such hub members 16 have reduced portions 17 removably telescoping in opposite ends of bearing sleeves 18 and which bearing sleeves 18 are directly journaled in the housings 12.

It will be noted that the reduced portions 17 have longitudinal extending slots at 19 and that washers 20 are removably strung on the portions 17 and engaged by the opposite ends of sleeves 18. Such washers 20 have lugs or projections at 21 and the sleeves 18 have a projection or projections 22. Said projections 21 and 22 removably enter the slots 19 and hold the sleeves 18 against rotation independently of the hub members 16.

In the present construction, it will be realized that the wear primarily occurs on the sleeves 18. As a result, the sleeves may be readily removed and replaced. To the end that the bearings may be maintained in efficient condition when repair and replacement may be made at a minimum cost and especially as compared with the cost of replacement of disc units as in usual construction.

Various changes may be resorted to provided they fall within the spirit and scope of the invention.

I claim as my invention:—

1. A bearing assembly of the class described comprising elements, each having a hub member, the hub members being in spaced apart relation, a removable bearing sleeve mounted on said hub members and adapted to journal and support the assembly in a hanger, said hub members having reduced portions telescoped in said sleeve at opposite ends, a shaft polygonal in cross-section removably passing through the hub members, and washers on said reduced portions engaged by the opposite ends of the sleeve, and means of interengagement between the sleeve and hub members to cause the sleeve to rotate unitarily with said hub members.

2. A bearing assembly of the class described comprising elements, each having a hub member, the hub members being in spaced apart relation, a removable bearing sleeve mounted on said hub members and adapted to journal and support the assembly in a hanger, said hub members having reduced portions telescoped in said sleeve at opposite ends, a shaft polygonal in cross-section removably passing through the hub members, and washers on said reduced portions engaged by the opposite ends of the sleeve, said reduced portions having slots therein, and projections on said sleeve and said washers disposed in said slots to cause the hub members, washers and sleeves to rotate unitarily.

GEORGE W. STAIR.